(No Model.)

A. SHERMAN.
STEAM COOKER.

No. 273,901. Patented Mar. 13, 1883.

Witnesses,
Geo. H. Strong.
J. H. Krouse

Inventor
Anna Sherman
By Dewey & Co.
Attorneys

UNITED STATES PATENT OFFICE.

ANNA SHERMAN, OF ALAMEDA, CALIFORNIA.

STEAM-COOKER.

SPECIFICATION forming part of Letters Patent No. 273,901, dated March 13, 1883.

Application filed January 2, 1883. (No model.)

*To all whom it may concern:*

Be it known that I, ANNA SHERMAN, of Alameda, county of Alameda, State of California, have invented an Improved Steam-Cooker; and I hereby declare the following to be a full, clear, and exact description thereof.

My invention relates to a vessel for cooking purposes, which is especially adapted to be used in connection with a tea-kettle for producing the necessary heat.

It consists of one or more containing-vessels fitted vertically, and having a central tube projecting from the bottom, and also extending up into the vessel, so as to form an annular chamber around the tube within the vessel. Around the lower part of the tube is a flange which supports the device and forms a cover for the kettle below. Perforated gratings are fitted to the annular space, and bridges across the top of the tube serve to support other vessels within the outer one.

Figure 1:
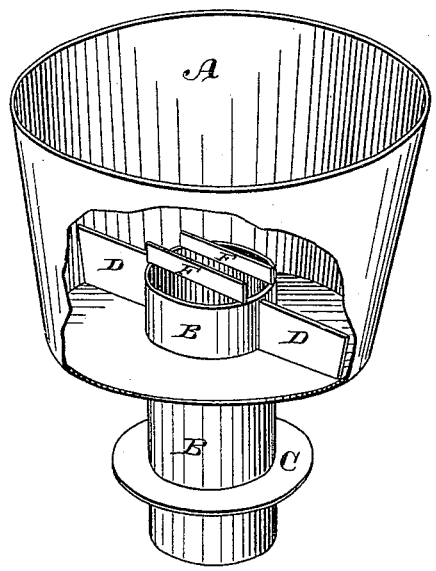
Figure 2:
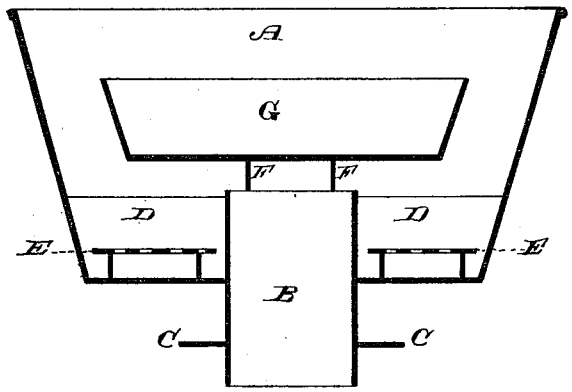
Figure 4:
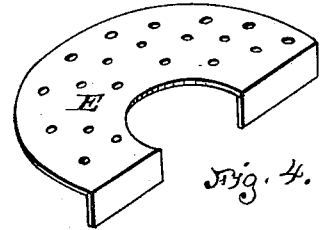
Figure 3:
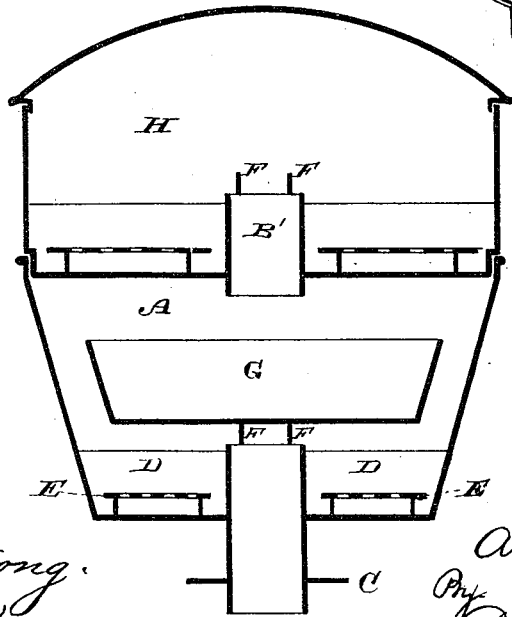

Referring to the accompanying drawings for a more complete explanation of my invention, Figure 1 is a perspective view of my apparatus. Figs. 2 and 3 are vertical sections. Fig. 4 is a perspective view of perforated false bottom.

Where there are but small accommodations it is often difficult to cook satisfactorily or conveniently, and my apparatus is designed to overcome this difficulty.

A is a vessel, preferably made with flaring sides, and having a tube, B, passing centrally through its bottom and soldered therein. This tube is small enough to allow its lower end to enter the hole in the top of any ordinary tea-kettle after the cover has been removed, and it has a flange, C, secured to it at a convenient point between its lower end and the bottom of the vessel A. This flange serves to support the vessel, and at the same time forms a cover for the tea-kettle, to prevent the steam escaping except up through the tube, which projects a short distance into the kettle, the spout of the kettle being provided with a cap to prevent the escape of steam in that direction. The tube projects a short distance above the bottom of the vessel A, so that an annular space is formed around it, which may be subdivided by partitions D, so that different articles may be cooked in each compartment without coming in contact. Perforated diaphragms E are fitted to these compartments, and have feet which elevate them from the bottom, and they thus keep the articles out of the water which condenses within them. By this construction the steam from the kettle serves to cook various articles within the vessel, and the water which condenses remains within the compartments and does not return to the kettle. The water within the kettle is thus always kept clean and fresh for tea or other uses. Across the top of the tube I fix two narrow bars or bridges, F, which act as supports for a pan or vessel, G. These bars do not interrupt the rising column of steam, being narrow, and they support the vessel G at such a height above the tube as to allow the steam to pass freely around it. By this arrangement meat and vegetables may be cooked in the compartments surrounding the tube and a pudding or other articles within the vessel G by the same heat without intermingling the flavors.

If desired, a second chamber, H, may be fitted to the top of the first one, and provided with a similar tube, B', which projects up a short distance into it, so as to form an annular compartment around it to receive and retain the condensed water. Whenever the cooking has been finished the chamber or vessel may be removed, and the tea-kettle is then in readiness for its ordinary uses by removing the cap from the spout, the water being entirely uncontaminated from the articles within the cooking-vessel.

Having thus described my invention, what I claim as new, and desire to secure by Letters Patent, is—

1. The vessel A, having the central tube, B, extending through the bottom for the admission of steam to its interior, and the annular compartment around the tube, in combination with the bars or bridges F, extending across the tube and forming a support for a vessel, G, above the tube, substantially as herein described.

2. In combination with a kettle or other steam-producing device, the vessels A H, with the central tubes, B B', the annular compartments surrounding the tubes, and the bridges or supports F F, substantially as and for the purpose herein described.

In witness whereof I have hereunto set my hand.

ANNA SHERMAN.

Witnesses:
G. W. EMERSON,
S. H. NOURSE.